J. PHILLIPS.
SAW.
No. 107,808.  Patented Sept. 27, 1870.
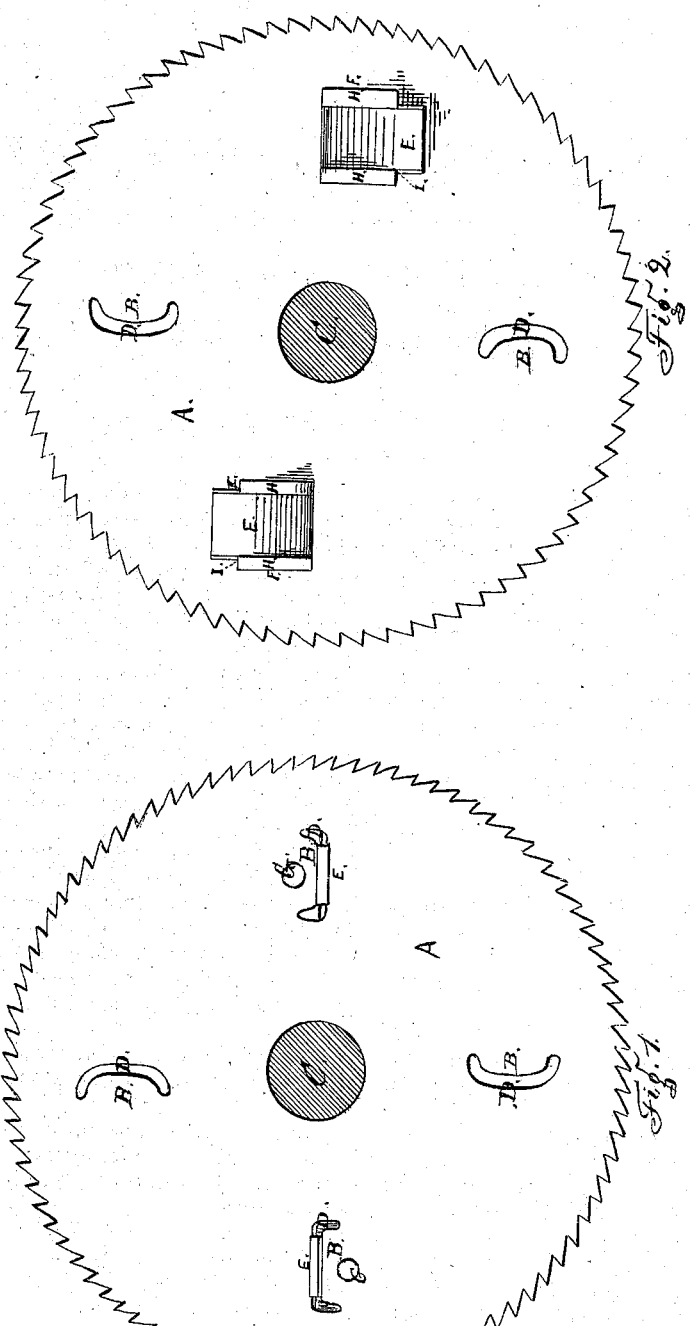

UNITED STATES PATENT OFFICE.

JOHN PHILLIPS, OF CHICAGO, ILLINOIS.

IMPROVEMENT IN SAWS.

Specification forming part of Letters Patent No. 107,808, dated September 27, 1870.

*To all whom it may concern:*

Be it known that I, JOHN PHILLIPS, of Chicago, in the county of Cook and State of Illinois, have invented a new and useful Improvement in Circular Planing-Saws; and I do hereby declare the following to be a full, clear, and exact description thereof, which will enable others skilled in the art to which my invention appertains to make and use the same, reference being had to the accompanying drawings, forming part of this specification.

Figures 1 and 2 are plan views of the opposite sides of my improved saw.

Similar letters of reference indicate corresponding parts in the several figures of the drawings.

My invention has for its object to provide a circular saw with planing-bits, for the purpose of planing a strip of lumber as it is sawed—that is to say, it shall both saw and plane the lumber simultaneously.

The invention consists in a series of removable planing-bits and their holders, in combination with the circular-saw plate, as will be hereinafter more fully described.

In the accompanying drawings, A is a circular saw of ordinary or suitable construction.

B B are planing-bits, struck up from the face of the saw in radial lines between the perimeter and eye C, as shown in the drawings, with a curved opening, D, in front of each bit, for the passage of shavings. The bits B are sharpened to form cutters, and may be struck up to project from one or both sides of the saw. If desired, when the bits project from one side of the saw only, adjustable planing-irons or bits E may be employed in two or more of the curved openings D. These bits are held in blocks F, attached by rivets G to one side of the saw-plate, and provided in their inclined faces H with grooves I, to receive the edges of the adjustable planing-irons E.

By my invention a circular saw is produced which shall plane lumber while it is sawing the same. If the bits are placed upon one side of the saw only, one side of the kerf formed in the lumber will be planed; but if struck up alternately upon each side a strip of lumber can be planed upon both sides as it is sawed—that is to say, in sawing boards from a log the first board will be planed upon one side only, but both sides of the saw-kerf will be planed, and consequently when the succeeding boards are formed they will leave the saw planed upon both sides.

Having thus described my invention, what I claim as new, and desire to secure by Letters Patent, is—

The removable planing-bits E and blocks F, in combination with the circular-saw plate A, substantially as herein described, for the purpose specified.

JOHN PHILLIPS.

Witnesses:
   G. H. FROST,
   E. A. ELLSWORTH.